(12) United States Patent
Assarabowski et al.

(10) Patent No.: US 6,958,195 B2
(45) Date of Patent: Oct. 25, 2005

(54) STEAM GENERATOR FOR A PEM FUEL CELL POWER PLANT

(75) Inventors: Richard J. Assarabowski, Vernon, CT (US); Sean P. Breen, Holyoke, MA (US); Steven A. Lozyniak, South Windsor, CT (US); William T. Unkert, Tolland, CT (US); Joseph B. Wysocki, Somers, CT (US); Masaki M. Yokose, South Windsor, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 609 days.

(21) Appl. No.: 10/078,086

(22) Filed: Feb. 19, 2002

(65) Prior Publication Data

US 2003/0157380 A1     Aug. 21, 2003

(51) Int. Cl.[7] ............................................. H01M 8/00
(52) U.S. Cl. ........................... 429/13; 429/12; 429/17
(58) Field of Search .............................. 429/12, 13, 17

(56) References Cited

U.S. PATENT DOCUMENTS

| | | | | |
|---|---|---|---|---|
| 6,093,501 A | * | 7/2000 | Werth | 429/17 |
| 6,124,053 A | * | 9/2000 | Bernard et al. | 429/34 |
| 6,274,259 B1 | * | 8/2001 | Grasso et al. | 429/13 |
| 6,436,562 B1 | * | 8/2002 | DuBose | 429/13 |
| 2002/0012893 A1 | * | 1/2002 | Kaufmann | 431/268 |

* cited by examiner

Primary Examiner—Dah-Wei Yuan
(74) Attorney, Agent, or Firm—William W. Jones

(57) ABSTRACT

A burner assembly includes a catalyzed burner for combusting an anode exhaust stream from a polymer electrolyte membrane (PEM) fuel cell power plant. The catalysts coated onto the burner can be platinum, rhodium, or mixtures thereof. The burner includes open cells which are formed by a lattice, which cells communicate with each other throughout the entire catalyzed burner. Heat produced by combustion of hydrogen in the anode exhaust stream is used to produce steam for use in a steam reformer in the PEM fuel cell assembly. The catalyzed burner has a high surface area wherein about 70–90% of the volume of the burner is preferably open cells, and the burner has a low pressure drop of about two to three inches water from the anode exhaust stream inlet to the anode exhaust stream outlet. The burner assembly operates at essentially ambient pressure and at a temperature of up to about 1,700° F. (927° C.). The burner assembly can combust anode exhaust during normal operation of the fuel cell assembly. The burner assembly also includes an adjunct burner which can combust gasoline or anode bypass gas (the latter of which is a reformed fuel gas which is tapped off of the fuel cell stack fuel inlet line) during startup of the fuel cell power plant. Once start up of the fuel cell power plant is achieved, the burner assembly will need only combustion of the anode exhaust by the catalytic burner to produce steam for the reformer.

7 Claims, 2 Drawing Sheets

STEAM GENERATOR FOR A PEM FUEL CELL POWER PLANT

TECHNICAL FIELD

This invention relates to a steam generator assembly which burns different types of fuels associated with the operation of a polymer electrolyte membrane (PEM) fuel cell power plant. More particularly, this invention relates to a steam generator assembly of the character described which utilizes a burner assembly that includes both a gasoline burner and a catalytic burner for combusting the anode exhaust stream to produce steam for use in the fuel cell power plant.

BACKGROUND ART

Polymer electrolyte membrane (PEM) fuel cells operate at relatively low temperatures, typically in the range of about 100° F. (38° C.) to about 200° F. (93° C.), and often at essentially ambient pressure. A PEM cell anode exhaust gas stream primarily contains water, carbon dioxide and small amounts of hydrogen. For efficiency and emission reasons, the fuel remaining in the anode exhaust gas stream after it passes through the fuel cell power plant needs to be used in the operation of the PEM cell power plant. However, this can not be done with a conventional homogeneous burner. The inability to conventionally utilize the anode exhaust gas stream from a fuel cell power plant to provide additional energy for operation results from: a) the high water and $CO_2$ content in the anode exhaust stream; and b) the low hydrogen content of the anode exhaust stream.

It would be advantageous to be able to utilize the anode exhaust gas stream in a PEM fuel cell power plant to provide energy for operating the power plant to improve system efficiency, and to provide reduced emissions levels.

DESCRIPTION OF THE INVENTION

This invention relates to a system for utilizing the anode exhaust stream of a PEM fuel cell power plant to provide energy for operation of the power plant. The invention allows combustion of the anode exhaust gas stream to produce heat that can be used for producing steam for a reformer in the fuel cell power plant. The invention also provides start up capability by allowing for combustion of conventional fuels without damaging catalytic and heat exchanger elements designed to handle the lower quality anode exhaust fuel. The invention combustion device includes a combination burner/mixer assembly comprising a gasoline (or other conventional fuel) homogeneous burner (that serves as a mixer for anode exhaust and air) followed by a catalyzed burner member. The burner assembly also includes one or more heat exchange coils through which water flows, the water being converted to steam by either fuel combustion or anode exhaust stream combustion.

A PEM fuel cell power plant is a low temperature power plant, and operates at a temperature in the range of about 100° F. (38° C.) to about 200° F. (93° C.), and preferably at about 180° F. (82° C.), and preferably at essentially ambient pressures. For PEM fuel cells using any form of steam reformer, steam production from the cell stack waste heat is not an option, as it is with 400° F. (204° C.) phosphoric acid cells, so alternative steam production methods are required. As a result, the anode exhaust energy is the prime source for heat to create steam, but the anode exhaust consists largely of a small amount of $H_2$, $CO_2$, water vapor and, in the case of an autothermal reformer, some $N_2$. The hydrogen in the anode exhaust stream is typically below the normal combustibility level thus a catalytic burner is required.

It is therefore an object of this invention to provide a PEM fuel cell power plant that employs a catalytic burner which is operable to combust the exhaust gas stream from the anode side of the PEM fuel cell power plant.

It is a further object of this invention to provide a burner/mixer that is also operable to combust gasoline and/or PEM fuel cell power plant anode bypass gas during start-up of the power plant.

It is another object of this invention to provide a PEM fuel cell power plant anode exhaust stream burner assembly that is operable to produce steam for use in the fuel gas reformer station in the fuel cell power plant.

It is still a further object of this invention to limit emissions from a PEM fuel cell power plant anode during normal operation, start up and shut down of the fuel cell power plant.

These and other objects of the invention will become more readily apparent from the following detailed description of embodiments of the invention when considered in conjunction with the accompanying drawings, in which:

Figure 1:
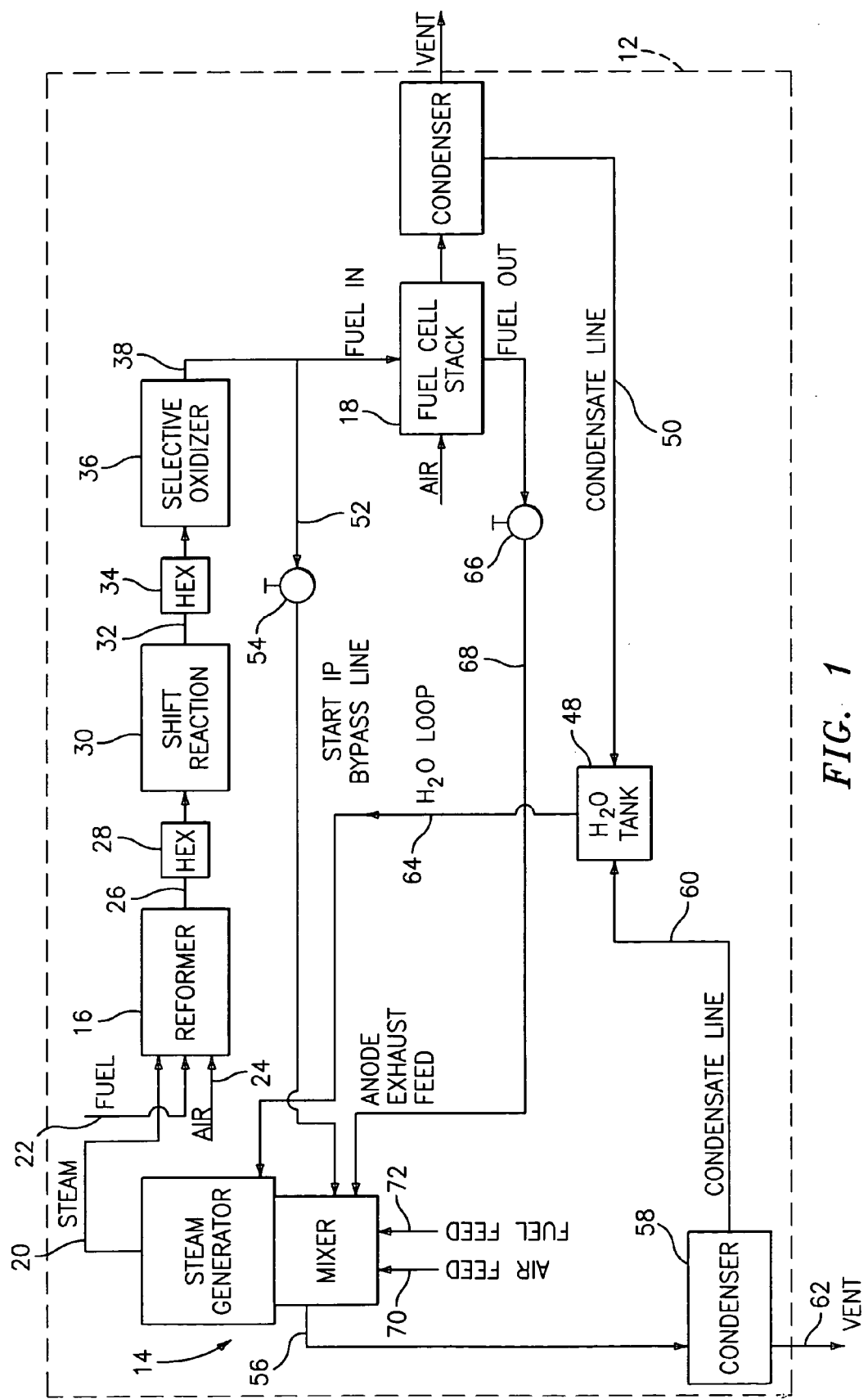
FIG. 1 is a schematic view of a solid polymer electrolyte membrane fuel cell power plant assembly which includes an anode exhaust gas stream combustion station which is formed in accordance with this invention.

Referring now to the drawings, there is shown in FIG. 1 a schematic view of a solid polymer electrolyte membrane (PEM) fuel cell power plant, denoted generally by the numeral 12, which is formed in accordance with this invention. The power plant 12 includes a multi-fuel burner/steam generating station 14 which produces steam for a reformer 16 as well as provide heat to raise the temperature of power plant components during start up. The reformer 16 converts a hydrocarbon fuel such as gasoline, diesel, ethanol, methanol, natural gas, or the like, to a hydrogen-enriched gas stream which is suitable for use in the active fuel cell stack 18 in the power plant 12. The steam generator station 14 produces steam, which is fed to the reformer 16 via a line 20. The fuel to be reformed is fed to the reformer 16 via a line 22, and air, in the case of an autothermal reformer, is fed to the reformer 16 via a line 24. The reformed fuel gas stream exits the reformer via line 26 and passes through a heat exchanger 28 which cools the reformed fuel gas stream. The reformed fuel gas stream then flows through a shift reaction station 30 wherein much of the CO in the fuel gas stream is converted to $CO_2$. The fuel gas stream exits the station 30 via a line 32 and passes through a heat exchanger 34 wherein the fuel gas stream is cooled. The fuel gas stream then passes through a selective oxidizer 36 wherein the remaining CO in the fuel gas stream is further reduced and thence through a line 38 to the power plant fuel cell stack 18. The reformed fuel passes through the anode side of the fuel cells in the stack 18.

During startup the fuel gas stream bypasses the stack by being bled off from the line 38 through a line 52 which connects to the burner/mixer steam generator station 14 in order to provide additional fuel for heat up and to minimize emissions. A valve 54 serves to control the flow of fuel through the line 52, the valve 54 being actuated by a fuel cell power plant operating processor controller (not shown). Burner exhaust from the station 14 is removed from the station 14 via line 56 that directs the exhaust stream to a condenser 58 where water is condensed out of the exhaust stream. The water condensate is transferred from the condenser 58 to the water tank 48 through a line 60, and the dehydrated exhaust stream is vented from the power plant 2 through a vent 62. Water from the water storage tank 48 is fed to the steam generator station 14 through a line 64.

Once the fuel cell power plant 12 achieves operating temperature, the valve 54 will be closed and the valve 66 in a line 68 will be opened by the power plant controller. The line 68 directs the fuel cell stack anode exhaust stream to the station 14 wherein hydrocarbons in the anode exhaust stream are combusted. The anode exhaust stream contains both water and hydrocarbons. During startup of the power plant 12, the station 14 can be provided with air through line 70 and raw fuel for combustion through line 72 as well as anode bypass gas provided through line 52. The fuel can be natural gas, gasoline, ethanol, methanol, hydrogen or some other combustible material. Air is always provided to the station 14 through line 70 regardless of the source of the combustible fuel.

Figure 2:
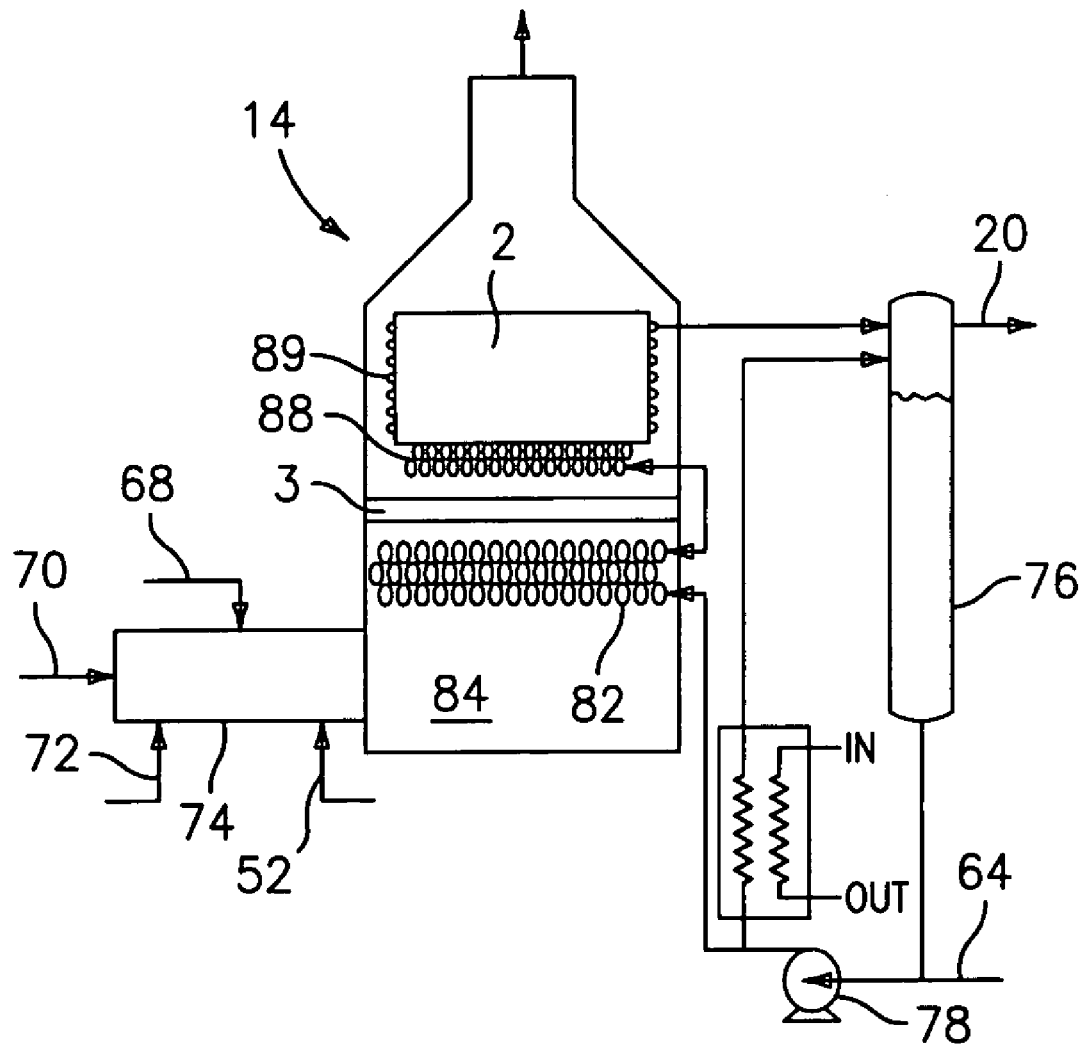
FIG. 2 is a schematic view of one embodiment of a burner/steam generating station for use in the power plant assembly of this invention.

Referring now to FIG. 2, there is shown details of one embodiment of the burner/mixer steam generator station 14 of the power plant 12. The station 14 includes a first mixer/burner chamber 74 where the fuel (other than lean fuel anode exhaust) and air are combusted in a swirl-stabilized combustion burner during start up to produce steam. The hot exhaust of this gasoline burner passes through a first heat exchanger 82 which reduces the temperature of the gasoline burner exhaust to an acceptable level for the catalytic burner 2. The catalytic burner 2 is heated by the gasoline burner exhaust stream, and it is also used to reduce the carbon monoxide emissions from the gasoline burner. A gas stream diffuser 3 can be used to provide a diffuse flow of gasoline burner exhaust or anode exhaust to the catalytic burner 2.

The gasoline start up burner has two purposes. During start up, prior to operation of the catalytic burner, it is used to produce hot gas for steam generation. It does this by mixing finely atomized gasoline droplets with air, and burning the gasoline. Gasoline is introduced into the burner by means of a pressure atomizing fuel injector and mixed with the air which enters through a swirler and a series of primary and secondary dilution holes. Proper sizing and placement of the air entry holes produces a stable recirculation zone in the vicinity of the fuel injector which ensures stable combustion without the need to actuate an igniter once ignition has taken place. This also produces complete combustion of the fuel and a relatively even exit temperature profile.

The other purpose of the gasoline burner is as an air/anode exhaust mixer which premixes air and anode exhaust gas prior to combustion on the catalytic burner. The start burner functions in this mixer mode during normal power plant operation when the remaining hydrogen in the anode exhaust is burned on the catalytic burner to produce the steam needed for power plant operation.

During startup of the fuel processing system, the hot gas from the gasoline burner 74 is used to transfer heat into water which is pumped by a circulating pump 78 through the first heat exchanger 82 and thence through a second heat exchanger 88 and a third heat exchanger 89. The circulating pump flow rate is sufficiently high to maintain two-phase flow in the heat exchangers 82, 88 and 89 at all times. The two phase (liquid/gas) component flow which is maintained, simplifies control requirements and limits heat exchanger size. This two-phase flow stream is pumped into a steam accumulator 76, where the liquid water is recirculated back through the heat exchangers 82, 88 and 89, while saturated steam is extracted from the accumulator 76 for use in the fuel processing system. Feed water to the circulating pump 78 is provided to maintain the liquid level in the accumulator at appropriate levels. As the fuel processing system begins to generate low-quality reformate, this reformate bypasses the anode of the fuel cell and is fed into the mixing section of the gasoline burner 74 to be combusted.

During normal operation, the fuel cell anode exhaust is supplied to the burner/mixer 74 together with air. The burner/mixer 74 functions as an air/anode exhaust mixer. After mixing of the fuel cell anode exhaust with air, the resultant mixture is fed into the catalytic burner 2, without reducing its ability to operate as a gasoline burner during the start up phase. The anode exhaust mixture is combusted catalytically in the catalytic burner 2. Radiant and convective heat from the catalytic burner 2 is transferred to the heat exchanger coils 88, with the remainder of the convective heat transfer occurring in the heat exchanger 89. As during startup operation, the circulating pump 78 maintains two-phase flow in the heat exchangers and saturated steam is extracted from the accumulator 76.

It will be readily appreciated that the assembly of this invention will enable the use of anode exhaust to be used as a source of heat for producing steam for operating a PEM fuel cell power plant due to the inclusion of a catalytic burner in the assembly. The inclusion of an auxiliary gasoline or other conventional hydrocarbon fuel burner allows the assembly to bring the fuel cell power plant up to operating temperatures prior to the use of the anode exhaust stream as a source of energy to produce steam for the power plant. The inclusion of an air swirler in the auxiliary burner portion of the assembly enables adequate mixture of air with the anode exhaust stream prior to combustion in the catalytic burner part of the assembly.

Since many changes and variations of the disclosed embodiment of the invention may be made without departing from the inventive concept, it is not intended to limit the invention otherwise than as required by the appended claims.

What is claimed is:

1. A polymer electrolyte membrane (PEM) fuel cell power plant burner assembly which burner assembly is operable to combust an anode exhaust gas emanating from a cell stack in the PEM fuel cell assemblage, said burner assembly comprising:
   a) a catalytic burner;
   b) an air/anode exhaust gas mixing station adjacent to and opening into said catalytic burner; and
   c) at least one heat exchanger disposed in heat exchange relationship with said catalytic burner, said heat exchanger being operable to convert water contained in said heat exchanger to a two phase mixture of water and steam by using heat generated by said catalytic burner from a mixture of anode exhaust gas and air which is combusted in said catalytic burner.

2. A polymer electrolyte membrane (PEM) fuel cell power plant burner assembly which burner assembly is operable to combust an anode exhaust gas emanating from a cell stack in the PEM fuel cell assemblage, said burner assembly comprising:
   a) a catalytic burner;
   b) an air/anode exhaust gas mixing station adjacent to and opening into said catalytic burner; and c) at least one heat exchanger disposed in heat exchange relationship with said catalytic burner, said heat exchanger being operable to convert water contained in said heat exchanger to a two phase mixture of water and steam by using heat generated by said catalytic burner from a mixture of anode exhaust gas and air which is combusted in said catalytic burner; and d) a gasoline or other conventional fuel burner associated with said mixing station, said conventional fuel burner being operable to combust a conventional fuel during start-up of the PEM fuel cell power plant so as to create heat for heating said catalytic burner and for creating said two phase mixture of water and steam in said heat exchanger.

3. The burner assembly of claim 2 further comprising an accumulator for receiving said mixture of water and steam from said heat exchanger, and first line for transporting steam from said accumulator to a steam reformer station of the fuel cell assemblage, and a second line for recycling water from said accumulator to said heat exchanger.

4. A method for producing steam for use in a steam reformer in a polymer electrolyte membrane (PEM) fuel cell power plant, said method comprising:

a) the step of providing a catalytic burner which operates at temperatures as high as about 1,700° F. (927° C.);

b) the step of combusting a fuel cell anode exhaust gas stream in said catalytic burner;

c) the step of converting a stream of water to a mixture of water and steam with heat produced by combustion of said fuel cell anode exhaust gas stream; and d) the step of feeding steam from said mixture to a catalytic fuel reformer in the fuel cell power plant.

5. A method for producing steam for use in a steam reformer in a polymer electrolyte membrane (PEM) fuel cell power plant, said method comprising:

a) the step of providing a catalytic burner which operates at temperatures as high as about 1,700° F. (927° C.);

b) the step of combusting a fuel cell anode exhaust gas stream in said catalytic burner;

c) the step of converting a stream of water to a mixture of water and steam with heat produced by combustion of said fuel cell anode exhaust gas stream; and d) the step of feeding steam from said mixture to a catalytic fuel reformer in the fuel cell power plant; and e) the step of collecting water from said mixture and recycling the collected water back to said catalytic burner for conversion of the collected recycled water into a water and steam mixture.

6. The method of claim 5 comprising the further step of combusting a conventional fuel such as gasoline so as to produce sufficient heat to bring said catalytic burner up to operating temperatures and to convert said stream of water to said mixture of water and steam during start up of the power plant.

7. The method of claim 4 comprising the further step of providing a swirled mixture of air and anode exhaust prior to introducing the anode exhaust into said catalytic burner.

* * * * *